(12) United States Patent
Angelino

(10) Patent No.: US 9,896,855 B2
(45) Date of Patent: Feb. 20, 2018

(54) SKIMMER BASKET FOR SWIMMING POOLS

(71) Applicant: Paul Angelino, Orlando, FL (US)

(72) Inventor: Paul Angelino, Orlando, FL (US)

( * ) Notice: Subject to any disclaimer, the term of this patent is extended or adjusted under 35 U.S.C. 154(b) by 38 days.

(21) Appl. No.: 14/822,260

(22) Filed: Aug. 10, 2015

(65) Prior Publication Data

US 2017/0044785 A1 Feb. 16, 2017

(51) Int. Cl.
E04H 4/12 (2006.01)
B01D 29/25 (2006.01)

(52) U.S. Cl.
CPC ........... *E04H 4/1272* (2013.01); *B01D 29/25* (2013.01); *E04H 4/1236* (2013.01)

(58) Field of Classification Search
CPC ..... E04H 4/1209; E04H 4/1254; B01D 29/23; B01D 29/25
USPC ........ 210/167.1, 167.19, 232, 237, 238, 448
See application file for complete search history.

(56) References Cited

U.S. PATENT DOCUMENTS

| | | | | |
|---|---|---|---|---|
| 3,469,700 A | * | 9/1969 | Johnson | E04H 4/1236 210/167.16 |
| 3,513,977 A | * | 5/1970 | Bellinson | B01D 29/117 210/167.12 |
| 3,542,201 A | * | 11/1970 | Belonger | B01D 35/26 210/167.1 |
| 4,460,462 A | * | 7/1984 | Arneson | E04H 4/1236 210/163 |
| 6,071,403 A | * | 6/2000 | Usher | B01D 29/117 210/167.12 |
| 6,187,181 B1 | * | 2/2001 | Stoltz | E04H 4/1263 15/1.7 |
| 8,168,065 B1 | * | 5/2012 | Gavigan | C02F 1/76 210/167.11 |
| 2008/0078711 A1 | * | 4/2008 | Ensor | E04H 4/1218 210/167.1 |
| 2009/0050545 A1 | | 2/2009 | Goffman | |
| 2015/0136678 A1 | * | 5/2015 | Lopez | E04H 4/1209 210/237 |
| 2015/0354241 A1 | * | 12/2015 | Pettit | B01D 29/35 210/791 |

FOREIGN PATENT DOCUMENTS

CA 2846017 A1 7/2014

* cited by examiner

Primary Examiner — Fred Prince
(74) Attorney, Agent, or Firm — Baker Hostetler LLP

(57) ABSTRACT

The present disclosure provides a skimmer basket assembly. The skimmer basket assembly may include a basket, the bottom of which may include one or more flaps. A handle may be connected to the basket via one or more connectors. The handle may include a trigger mechanism that is mechanically linked to the one or more flaps of the basket. The trigger mechanism may be configured to operate the one of more flaps of the basket upon manipulation of the trigger mechanism. The skimmer basket assembly may include a lid that is slidingly connected to the one or more connectors. The lid may be configured to receive the handle therein and substantially cover a top opening of the basket.

20 Claims, 5 Drawing Sheets

FIG. 3

SKIMMER BASKET FOR SWIMMING POOLS

TECHNICAL FIELD

The technical field relates generally to swimming pool maintenance and more particularly to a skimmer basket for use with a swimming pool.

BACKGROUND

The water in a swimming pool may be host to a number of contaminants, ranging from microscopic contaminants, such as bacteria, viruses, protozoa, or fungi, to larger contaminants, such as leaves, sticks, hair clumps, or even animals. In order to eliminate these contaminants, a pool may contain a filtration system, wherein water is drawn off from the top of the water level via a water pump and passed through one or more filters before being recirculated back into the pool. In order to trap the larger contaminants before the water is passed through the water pump and small-particle filters, a skimmer basket may be positioned within a skimmer basket well, which is in fluid communication with the water pump. The skimmer basket may typically be accessed via an opening at the top of the skimmer basket well and removed for cleaning. The removal and cleaning of the skimmer basket may prove to be an unpleasant task due to the occasional presence of an objectionable item trapped by the skimmer basket, such as a small animal (e.g., a rodent, insect, snake, etc.), a hair clump, or decayed matter. These and other shortcomings of the prior art are addressed by the present disclosure.

SUMMARY

A skimmer basket assembly is disclosed that includes a basket. The bottom of the basket may include one or more flaps, by which the contents of the basket may be evacuated when opened. A handle may be connected to the basket via one or more connectors. The handle may include a trigger mechanism that is mechanically linked to the one or more flaps of the basket. The trigger mechanism may be manipulated to effectuate the opening of the one or more flaps of the basket. The skimmer basket assembly may further include a lid that is slidingly connected to the one or more connectors. The lid may be configured to accommodate the handle therein, such as when the skimmer basket assembly is in place in a skimmer basket well, for example. The lid may further be configured to substantially cover a top opening of the basket, such as when the skimmer basket assembly is lifted out of a skimmer basket well, for example.

BRIEF DESCRIPTION OF THE DRAWINGS

The following detailed description is better understood when read in conjunction with the appended drawings. For the purposes of illustration, exemplary examples are shown in the drawings; however, the subject matter is not limited to the specific elements and instrumentalities disclosed. In the drawings.

DETAILED DESCRIPTION OF ILLUSTRATIVE EMBODIMENTS

Described herein is a skimmer basket assembly that may be used with a swimming pool filtration system.

In describing embodiments of the present disclosure illustrated in the figures, specific terminology is employed for the sake of clarity. The disclosure, however, is not intended to be limited to the specific terminology so selected, and it is to be understood that each specific element includes all technical equivalents that operate in a similar manner to accomplish a similar purpose.

Figure 1:
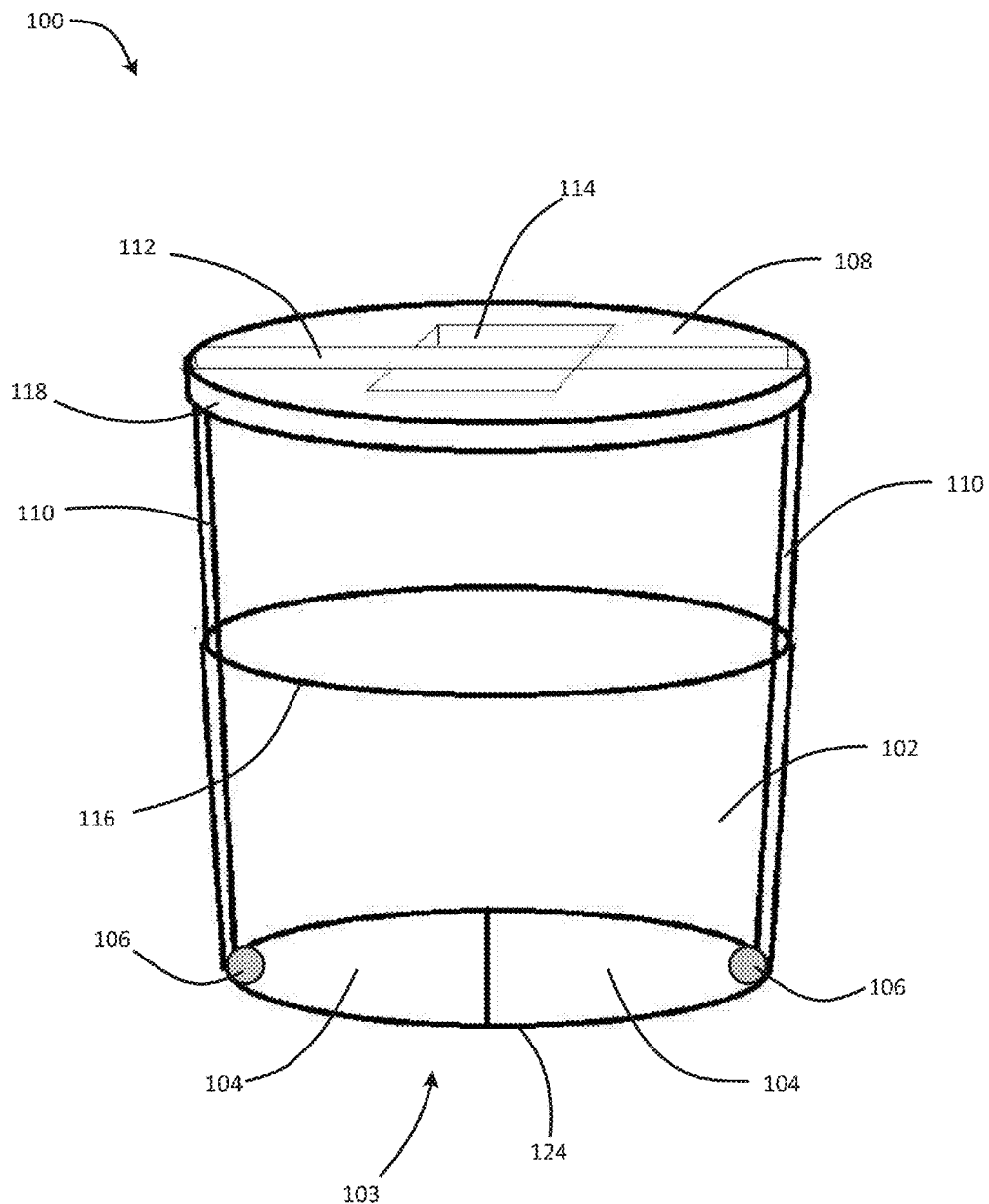
FIG. 1 illustrates a perspective view of an exemplary skimmer basket assembly.

FIG. 1 is a perspective view of an example skimmer basket assembly 100. The skimmer basket assembly 100 may include a basket 102. The basket 102 is depicted as transparent in FIGS. 1-3 for illustrative purposes. The basket 102 may be cylindrical, cube-shaped, or other shape. The basket 102 may be tapered such that, for example, the top portion of the basket 102 is wider than the bottom portion of the basket 102. Since the basket 102 may serve to trap larger debris, such as sticks, leaves, hair clumps, etc., the basket 102 may contain a plurality of holes, slots, or other similar openings that are sized and positioned to allow water and small particles to flow through the basket 102, while still retaining the larger debris within the basket 102. The basket 102 may be composed of any material that is unlikely to corrode or rust in water, such as plastic or stainless steel.

The skimmer basket assembly 100 may include a lid 108, which may be configured in a shape corresponding to the shape of the basket 102 such that the lid 108 substantially covers the opening at the top of the basket 102 when placed against the top of the basket 102. As examples, the lid 108 may be a circular shape in an embodiment containing a cylindrical basket 102, a square shape in an embodiment containing a cube-shaped basket 102, and so forth. The lid 108 may be sized so that a portion of the lid 108, such as a lip 118, rests against a surface, such as the pool deck, defining the opening to the skimmer basket well, such as the skimmer basket well 402 (FIGS. 4 and 5), in which the basket 102 may be situated. Alternatively, the lid 108 may be sized to rest upon a shelf, ledge, or other projection within the skimmer basket well. In an aspect, the lid 108 may be dome-shaped.

The lip 118 may be formed around the edge or periphery of the lid 108. The lip 118 of the lid 108 may be configured to interconnect with a rim 116 of the basket 102. For example, the lip 118 of the lid 108 may be of a slightly larger diameter than the rim 116 of the basket 102 and fit around the rim 116 of the basket 102. The lid 108 may be composed of plastic, stainless steel, or other corrosion- or rust-resistant material.

Figure 2:
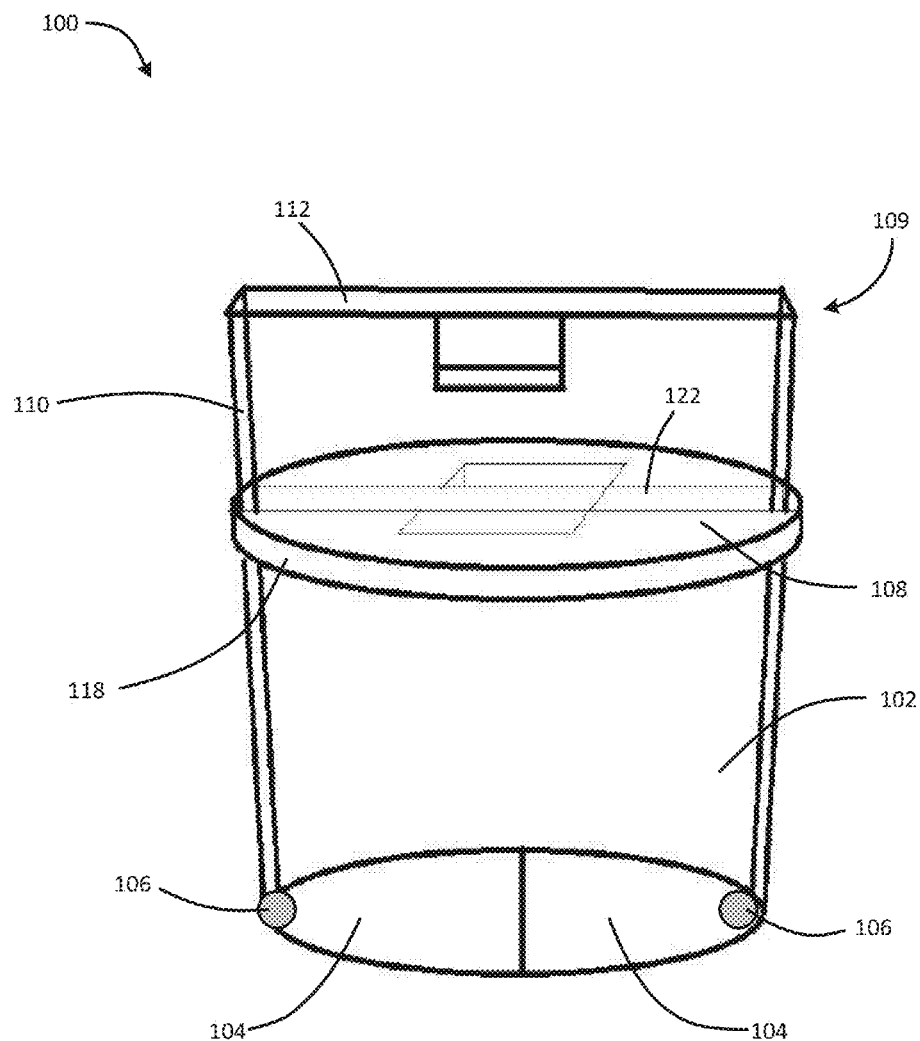
FIG. 2 illustrates a perspective view of an exemplary skimmer basket assembly.

The lid 108 may be connected to the basket 102 via a handle assembly 109 (FIG. 2). The handle assembly 109 may include a handle 112 and one or more connectors 110. The upper end of each of the connectors 110 may be attached to distal ends of the handle 112 and the lower end of each of the connectors 110 may be attached to the basket 102. In an aspect, the lower end of each of the connectors 110 may attach to or be incorporated within the basket 102 and extend to a bottom 103 of the basket 102. Each of the connectors 110 may be substantially normal to the handle 112. The handle 112 may fit within the top of the lid 108, such as being recessed within a groove 122 (shown in FIG. 2) running across the lid 108. The handle 112 may be substantially flush with the top of the lid 108. The lid 108 may include a recess 114 configured to accommodate a user's hand to facilitate the grasping of the handle 112. The recess 114 may be configured to accommodate a trigger mechanism (not visible in FIG. 1 and discussed further herein). The lid 108 may be slidingly displaced along the connectors 110 between the handle 112 and the rim 116 of the basket 102.

FIG. 2 is a perspective view of the example skimmer basket assembly 100 that illustrates the displacement of the lid 108 along the connectors 110. When a user lifts up the skimmer basket assembly 100 by the handle 112, connectors 110 may slide through lid 108, such as via one or more openings in the lid 108, and the connected basket 102 may be lifted. The lid 108 may remain substantially stationary within or upon the skimmer basket well until the basket 102 is lifted into contact with the lid 108. When the basket 102 is lifted into contact with the lid 108, the entire skimmer basket assembly 100 may be lifted out of the skimmer basket well. When the basket 102 is raised into contact with the lid 108, the lid 108 may secure the contents of the basket 102. In this manner, the user may be shielded, visually and/or physically, from any undesirable object that may be in the basket 102. For example, if a live snake was caught in the basket 102, the snake would be unable to physically contact the user while the basket 102 is lifted since the lid 108 may remain in place during the lifting process and after the skimmer basket assembly 100 is removed since the lid 108 may cover the top of the basket 102.

Returning to FIG. 1, the bottom 103 of the basket 102 may include one or more flaps 104. Like the basket 102, the one or more flaps 104 may each contain a plurality of holes, slots, or other similar openings that are sized and positioned to allow water and small particles to flow through the flap 104 while preventing large debris from flowing through the flap 104.

In an aspect, the basket 102 may include a pair of flaps 104 that are each connected to opposite sides of the basket 102, such as at a bottom rim 124 of the basket 102, via a hinge 106, as depicted in FIG. 1. The flaps 104 may be configured to open downwards from the basket 102. When closed, the flaps 104 may form a flat surface of the bottom 103 of the basket 102 and may be flush to each other and the bottom rim 124 of the basket 102. When the flaps 104 are closed, the flaps 104 may be configured so that large debris (i.e., debris too large to fit through the holes, slots, or other similar opening in the basket 102) is unable to escape the basket 102. But when the flaps 104 are opened, the flaps 104 may be configured so that any large debris may fall out of the bottom 103 of the basket 102.

In another aspect, the basket 102 may include a single flap 104 connected to the basket 102, such as the bottom rim 124, via a hinge 106. The flap 104 may be configured to open downwards from the basket 102 and, when closed, the flap 104 may be flush with the bottom rim 124 of the basket 102. The flap 104 may be configured so that when the flap 104 is closed, large debris is retained in the basket 102, but when the flap 104 is open, large debris may fall out of the bottom 103 of the basket 102.

One or more of the flaps 104 may be held in a closed position (i.e. flush with the bottom rim 124 of the basket 102) until the user causes one or more of the flaps 104 to be opened. For example, a spring attached to or disposed within one or more of the hinges 106 may cause one of more of the flaps 104 to be held in a closed position.

Figure 3:
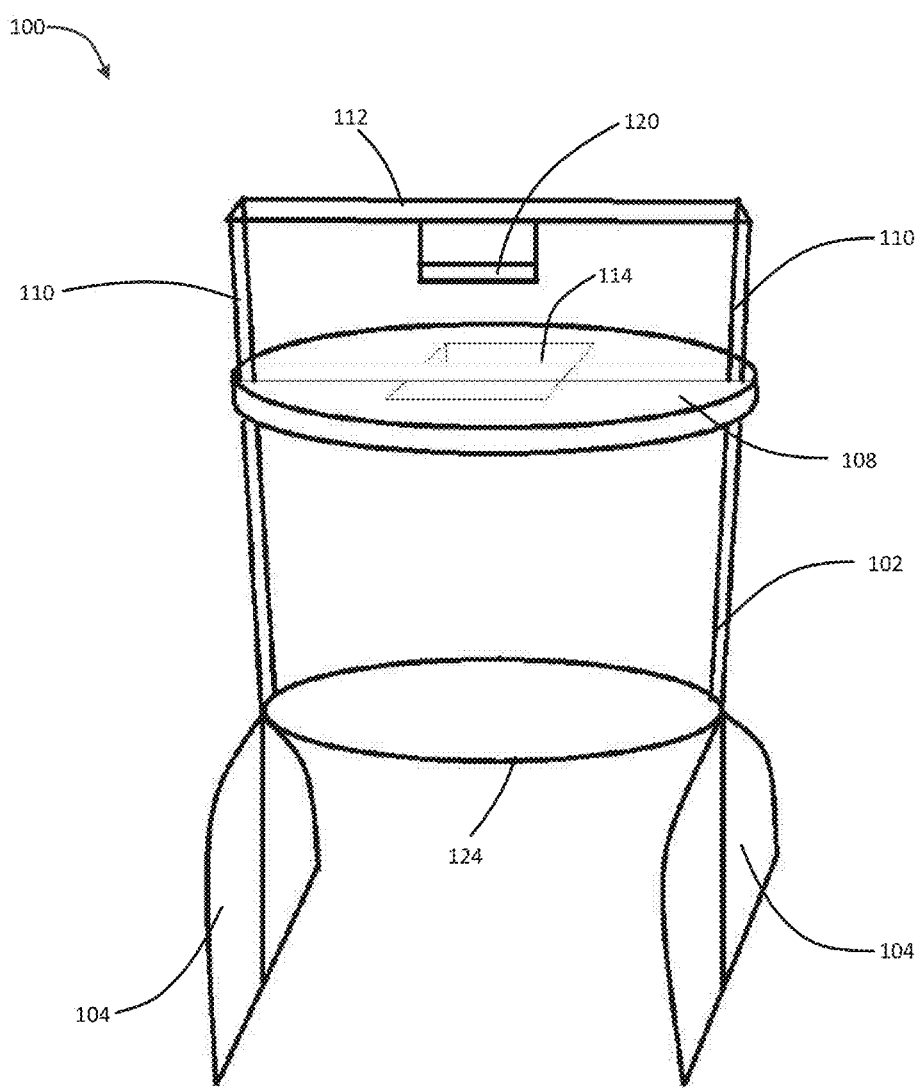
FIG. 3 illustrates a perspective view of an exemplary skimmer basket assembly.

FIG. 3 is a perspective view of the example skimmer basket assembly 100 showing an operation of the flaps 104 while the flaps 104 are in the open position. The handle 112 may include a trigger mechanism 120 by which the user may operate one or more flaps 104. The trigger mechanism 120 may fit within the recess 114, such as when the skimmer basket assembly 100 is in place in the skimmer basket well and the handle 112 is disposed within the lid 108. The trigger mechanism 120 may be mechanically linked to the flaps 104 to effectuate the flaps' 104 operation. For example, one or more cable linkages may traverse the handle 112, the connectors 110, and/or the basket 102 and connect the trigger mechanism 120 to one or more flaps 104. The user may manipulate the trigger mechanism 120, such as after removing the skimmer basket assembly 100 from the skimmer basket well, to open the flaps 104 and allow the contents of the basket 102 to fall out of the bottom 103 of the basket 102. As an example, if the basket 102 contained a dead rodent, the user may hold the basket 102 over a waste receptacle, squeeze the trigger mechanism 120 to open the flaps 104, and deposit the dead rodent in the waste receptacle from the now-open bottom 103 of the basket 102. This functionality may allow the user to eliminate or minimize contact with the dead rodent or even seeing the dead rodent.

Figure 4:
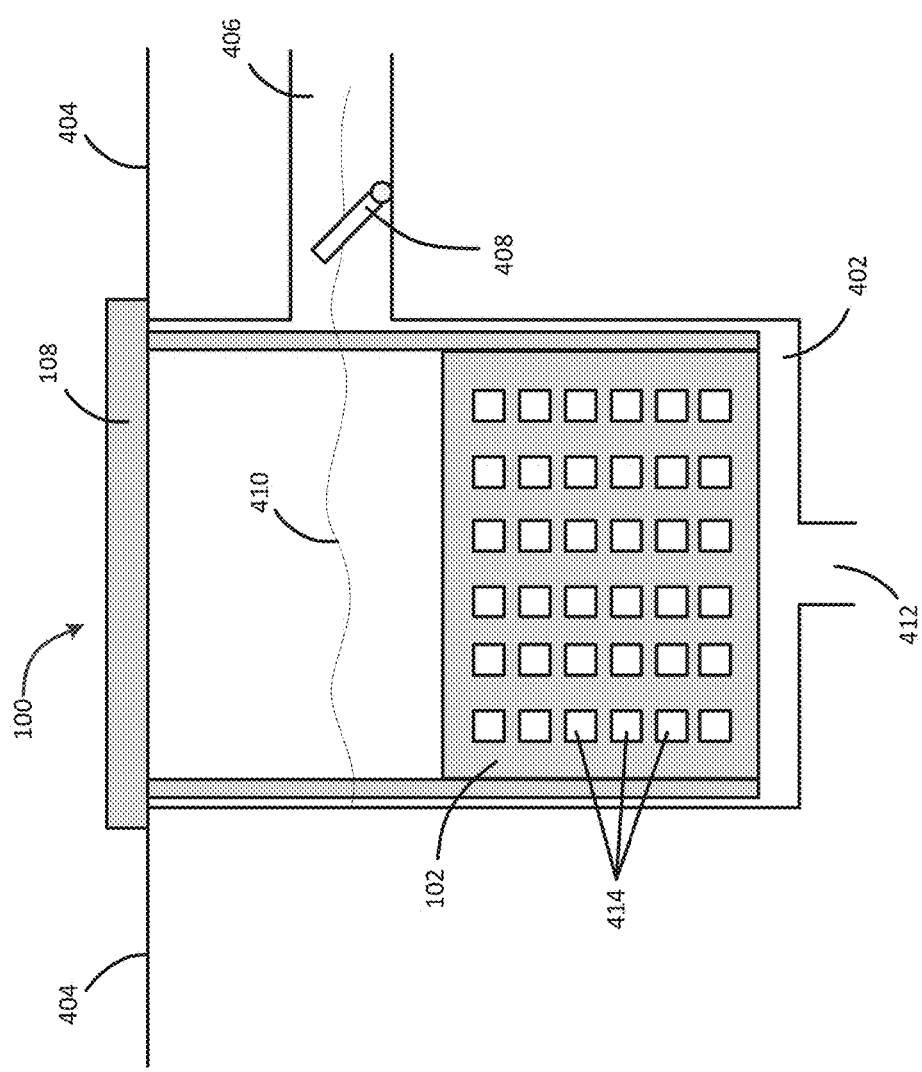
FIG. 4 illustrates a side view of an exemplary skimmer basket assembly in place in a skimmer basket well.

FIG. 4 is a side view of the example skimmer basket assembly 100 positioned in a skimmer basket well 402. The skimmer basket well 402 may be within a deck 404 of a pool. The water from the pool may flow into the skimmer basket well 402 via an input channel 406. A weir 408 positioned within the input channel 406 may prevent the backflow of water from the skimmer basket well 402 to the pool. The water may flow through the basket 102 and out the output channel 412, which may lead to additional filtering elements such as a small-particle filter. The skimmer basket assembly 100 may be positioned within the skimmer basket well 402 and/or configured so that the basket 102 is submerged below a waterline 410, as shown in FIG. 4, or so that the basket 102 is only partially submerged below the waterline 410. As depicted, the lid 108 may be configured so that it rests upon and is supported by the deck 404.

Also depicted in FIG. 4 are one or more openings 414 defined in the basket 102. The openings 414 may include holes or slots, for example, configured to allow water and other small particles to flow through the basket 102 but not larger particles, such as leaves, sticks, hair clumps, and so forth. The openings 414 may also be defined in one or more of the flaps 104. Each of the openings 414 may be square-shaped or circle-shaped, for example. The width or diameter, respectively, of the opening 414 in a square shape or a circle shape may be in the ranges of 0.1 to 1 inch, 0.2 to 0.8 inch, or 0.4 to 0.6 inch. It will be appreciated that not all openings 414 in FIG. 4 are labeled as such.

Figure 5:
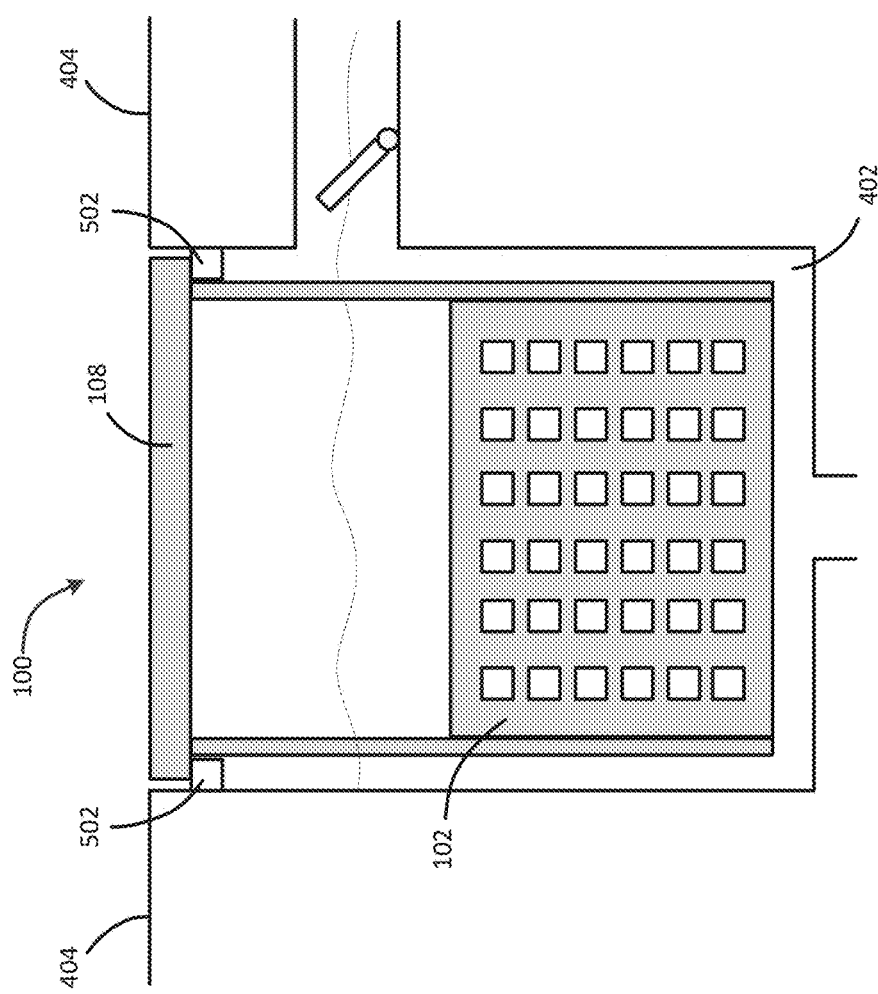
FIG. 5 illustrates a side view of an exemplary skimmer basket assembly in place in a skimmer basket well.

Similar to FIG. 4, FIG. 5 is a side view of the example skimmer basket assembly 100 positioned in the skimmer basket well 402. The skimmer basket well 402 may include one or more projections 502, upon which the lid 108 of the skimmer basket assembly 100 may be positioned and supported by. The projections 502 and the lid 108 may be configured so that the top of the lid 108 is substantially flush with the deck 404.

While the disclosure has been described in connection with the various embodiments of the various figures, it is to be understood that other similar embodiments can be used or modifications and additions can be made to the described embodiments. Therefore, the skimmer basket assembly as described herein should not be limited to any single embodi-

What is claimed:

1. A skimmer basket assembly comprising:
   a basket having a bottom comprising one or more flaps;
   one or more elongate connectors;
   a handle coupled to the basket via the one or more elongate connectors, wherein the handle comprises a trigger mechanism mechanically coupled to the one or more flaps, wherein the trigger mechanism is configured to open the one or more flaps upon a manipulation of the trigger mechanism, and wherein the one or more elongate connectors are elongated substantially over a space between the handle and a top rim of the basket; and
   a lid slidingly coupled to the one or more elongate connectors, wherein the lid is configured to selectively and substantially cover a top opening of the basket.

2. The skimmer basket assembly of claim 1, wherein the one or more flaps are flush to a bottom rim of the basket when the one or more flaps are in a closed position.

3. The skimmer basket assembly of claim 1, wherein the bottom comprises exactly two flaps.

4. The skimmer basket assembly of claim 3, wherein each of the two flaps are flush to each other when the two flaps are in a closed position.

5. The skimmer basket assembly of claim 1, wherein the bottom comprises exactly one flap.

6. The skimmer basket assembly of claim 1, wherein the lid further comprises a groove configured to receive the handle therein.

7. The skimmer basket assembly of claim 6, wherein the groove is configured such that the handle is flush with the lid when the handle is received within the groove.

8. The skimmer basket assembly of claim 1, wherein the lid further comprises a recess configured to accommodate the trigger mechanism.

9. The skimmer basket assembly of claim 8, wherein the recess is configured such that the handle is flush with the lid when the trigger mechanism is accommodated within the recess.

10. The skimmer basket assembly of claim 1, wherein each of the one or more flaps is connected to a bottom rim of the basket via a hinge.

11. The skimmer basket assembly of claim 1, wherein the trigger mechanism is mechanically connected to the one or more flaps via a cable.

12. The skimmer basket assembly of claim 1, wherein:
    the one or more elongate connectors comprises a first elongate connector and a second elongate connector; and
    the first elongate connector and the second elongate connector are each attached to distal ends of the handle.

13. The skimmer basket assembly of claim 1, wherein the one or more flaps each comprise a plurality of openings.

14. The skimmer basket assembly of claim 1, wherein the trigger mechanism is mechanically coupled to the one or more flaps via one or more cables traversing through the one or more elongate connectors.

15. The skimmer basket assembly of claim 1, wherein the one or more elongate connectors are substantially perpendicular to an elongate dimension of the handle.

16. The skimmer basket assembly of claim 15, wherein the one or more elongate connectors are substantially perpendicular to a plane defined by the top rim of the basket.

17. The skimmer basket assembly of claim 1, wherein the lid comprises one or more openings defined by a planar surface of the lid, and wherein the lid is slidingly coupled to the one or more elongate connectors via the one or more openings.

18. A skimmer basket assembly comprising:
    a basket having a bottom comprising one or more flaps;
    a handle comprising a trigger mechanism mechanically coupled to the one or more flaps, wherein the trigger mechanism is configured to open the one or more flaps upon a manipulation of the trigger mechanism;
    a lid configured to selectively and substantially cover a top opening of the basket; and
    one or more elongate connectors, wherein a lower end of the one or more elongate connectors is coupled to a top rim of the basket, wherein an upper end of the one or more elongate connectors is coupled to the handle, and wherein the lid is slidingly coupled to the one or more elongate connectors.

19. The skimmer basket assembly of claim 18, wherein the lower end of the one or more elongate connectors is further coupled to the basket proximate a junction of a sidewall of the basket and the bottom of the basket.

20. A skimmer basket assembly comprising:
    a basket having a bottom comprising one or more flaps;
    one or more elongate connectors;
    a handle coupled to the basket via the one or more elongate connectors, wherein the handle is mechanically coupled to the one or more flaps, wherein the handle is configured to selectively cause to open the one or more flaps, and wherein the one or more elongate connectors are elongated substantially over a space between the handle and a top rim of the basket; and
    a lid slidingly coupled to the one or more elongate connectors, wherein the lid is configured to selectively and substantially cover a top opening of the basket.

* * * * *